United States Patent
Zhan et al.

(10) Patent No.: US 9,218,542 B2
(45) Date of Patent: Dec. 22, 2015

(54) LOCALIZATION OF ANATOMICAL STRUCTURES USING LEARNING-BASED REGRESSION AND EFFICIENT SEARCHING OR DEFORMATION STRATEGY

(71) Applicant: Siemens Medical Solutions USA, Inc., Malvern, PA (US)

(72) Inventors: Yiqiang Zhan, West Chester, PA (US); Gerardo Hermosillo Valadez, West Chester, PA (US); Xiang Sean Zhou, Exton, PA (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 0 days.

(21) Appl. No.: 14/447,674

(22) Filed: Jul. 31, 2014

(65) Prior Publication Data
US 2015/0043799 A1 Feb. 12, 2015

Related U.S. Application Data

(60) Provisional application No. 61/863,957, filed on Aug. 9, 2013.

(51) Int. Cl.
*G06K 9/00* (2006.01)
*G06K 9/62* (2006.01)
(Continued)

(52) U.S. Cl.
CPC ............ *G06K 9/6217* (2013.01); *G06T 7/0081* (2013.01); *G06T 7/0087* (2013.01); *G06T 19/00* (2013.01); *G06T 2207/10081* (2013.01); *G06T 2207/10088* (2013.01); *G06T 2207/10104* (2013.01); *G06T 2207/10108* (2013.01); *G06T 2207/10116* (2013.01);
(Continued)

(58) Field of Classification Search
CPC ... G06K 9/6217; G06T 7/0087; G06T 7/0081
USPC ......................................... 382/128, 131, 155
See application file for complete search history.

(56) References Cited

U.S. PATENT DOCUMENTS

| | | | | |
|---|---|---|---|---|
| 2007/0055153 | A1* | 3/2007 | Simopoulos | A61B 8/00 600/437 |
| 2008/0085044 | A1* | 4/2008 | Zhou | G06K 9/00 382/131 |
| 2011/0188715 | A1* | 8/2011 | Shotton | G06K 9/00 382/128 |

(Continued)

OTHER PUBLICATIONS

Zhan, et al. "Active Scheduling of Organ Detection and Segmentation in Whole-Body Medical Images", Published in Medical Image Computing and Computer-Assisted Intervention A Miccai 2008 (Lecture Notes in Computer Science), vol. 5241, Sep. 2008, pp. 313-321.

(Continued)

*Primary Examiner* — John Strege
(74) *Attorney, Agent, or Firm* — Peter R. Withstandley

(57) ABSTRACT

Disclosed herein is a framework for localizing anatomical structures. In accordance with one aspect, the framework receives a learned regressor and image data of a subject. The learned regressor may be invoked to predict a first spatial metric from a seed voxel to a target anatomical structure in the image data. The learned regressor may further be invoked to predict second spatial metrics from candidate voxels to the target anatomical structure. The candidate voxels may be located around a search region defined by the first spatial metric. The candidate voxel associated with the smallest second spatial metric may then be output as a localized voxel.

20 Claims, 5 Drawing Sheets

(51) Int. Cl.
*G06T 19/00* (2011.01)
*G06T 7/00* (2006.01)

(52) U.S. Cl.
CPC ............ *G06T 2207/10121* (2013.01); *G06T 2207/10132* (2013.01); *G06T 2207/30004* (2013.01); *G06T 2210/41* (2013.01)

(56) References Cited

U.S. PATENT DOCUMENTS

| | | | | |
|---|---|---|---|---|
| 2012/0207359 | A1* | 8/2012 | Konukoglu | G06T 7/0034 382/128 |
| 2012/0269407 | A1* | 10/2012 | Criminisi | G06T 7/0048 382/128 |
| 2013/0182924 | A1* | 7/2013 | Lause | G06T 7/0014 382/131 |
| 2014/0185924 | A1* | 7/2014 | Cao | G06K 9/00248 382/159 |
| 2015/0186748 | A1* | 7/2015 | Cootes | G06K 9/6282 382/159 |

OTHER PUBLICATIONS

Ling, et al. "Hierarchical, Learning-Based Automatic Liver Segmentation", CVPR, 2008, 8 pages.
Criminisi, et al. "Regression forests for efficient anatomy detection and localization in computed tomography scans." Medical image analysis 17.8 (2013): 1293-1303.
Breiman, Leo. "Random forests." Machine learning 45.1 (2001): 5-32.
Freund, et al. "A Decision-Theoretic Generalization of On-Line Learning and an Application to Boosting", Journal of Computer and System Sciences 55 (1) (1997), pp. 119-139.
Zhan, et al. "Cross modality deformable segmentation using hierarchical clustering and learning", Miccai (1) 2009: pp. 1033-1041.
Rueckert, et al. "Medical Image Registration", Biomedical Image Processing, Springer Berlin Heidelberg, 2011, pp. 131-154.

* cited by examiner

LOCALIZATION OF ANATOMICAL STRUCTURES USING LEARNING-BASED REGRESSION AND EFFICIENT SEARCHING OR DEFORMATION STRATEGY

CROSS-REFERENCE TO RELATED APPLICATION

This application claims the benefit of U.S. provisional application No. 61/863,957 filed on Aug. 9, 2013, the entire contents of which are incorporated herein by reference.

TECHNICAL FIELD

The present disclosure generally relates to diagnostic imaging and, more specifically, to automated or semi-automated systems and methods for facilitating localization of anatomical structures using learning-based regression.

BACKGROUND

The field of medical imaging has seen significant advances since the time X-Rays were first used to determine anatomical abnormalities. Medical imaging hardware has progressed from modern machines such as Medical Resonance (MR) imaging scanners, Computed Tomographic (CT) scanners and Positron Emission Tomographic (PET) scanners, to multimodality imaging systems such as PET-CT and PET-MRI systems. Because of large amount of image data generated by such modern medical scanners, there has been and remains a need for developing image processing techniques that can automate some or all of the processes to determine the presence of anatomical abnormalities in scanned medical images.

Digital medical images are constructed using raw image data obtained from a scanner, for example, a CAT scanner, MRI, etc. Digital medical images are typically either a two-dimensional ("2D") image made of pixel elements, a three-dimensional ("3D") image made of volume elements ("voxels") or a four-dimensional ("4D") image made of dynamic elements ("doxels"). Such 2D, 3D or 4D images are processed using medical image recognition techniques to determine the presence of anatomical abnormalities such as cysts, tumors, polyps, etc. Given the amount of image data generated by any given image scan, it is preferable that an automatic technique should point out anatomical features in the selected regions of an image to a doctor for further diagnosis of any disease or condition.

Automatic image processing and recognition of structures within a medical image is generally referred to as Computer-Aided Detection (CAD). A CAD system can process medical images, localize and segment anatomical structures, including possible abnormalities (or candidates), for further review. Recognizing anatomical structures within digitized medical images presents multiple challenges. For example, a first concern relates to the accuracy of recognition of anatomical structures within an image. A second area of concern is the speed of recognition. Because medical images are an aid for a doctor to diagnose a disease or condition, the speed with which an image can be processed and structures within that image recognized can be of the utmost importance to the doctor in order to reach an early diagnosis. Hence, there is a need for improving recognition techniques that provide accurate and fast recognition of anatomical structures and possible abnormalities in medical images.

Localization and segmentation of anatomical structures play an important role across different stages of radiological workflows. In the imaging stage, for instance, locations of anatomical landmarks may help technicians to position high-resolution MR imaging planes. In the reading stage, locations, shapes and sizes of anatomical structures provide additional diagnostic clues. In the reporting stage, by exploiting the locations of anatomical structures, radiologists may describe their findings in a more precise and semantic way. Although anatomy detection and segmentation algorithms have been extensively studied, traditional automatic algorithms usually take a long time (e.g., few seconds or even minutes) to localize and segment anatomical structures, which cannot satisfy the requirements of real-world clinical use cases.

SUMMARY

The present disclosure relates to a framework for facilitating localization of anatomical structures. In accordance with one aspect, the framework receives a learned regressor and image data of a subject. The learned regressor may be invoked to predict a first spatial metric from a seed voxel to a target anatomical structure in the image data. The learned regressor may further be invoked to predict second spatial metrics from candidate voxels to the target anatomical structure. The candidate voxels may be located around a search region defined by the first spatial metric. The candidate voxel associated with the smallest second spatial metric may then be output as a localized voxel.

This summary is provided to introduce a selection of concepts in a simplified form that are further described below in the following detailed description. It is not intended to identify features or essential features of the claimed subject matter, nor is it intended that it be used to limit the scope of the claimed subject matter. Furthermore, the claimed subject matter is not limited to implementations that solve any or all disadvantages noted in any part of this disclosure.

BRIEF DESCRIPTION OF THE DRAWINGS

A more complete appreciation of the present disclosure and many of the attendant aspects thereof will be readily obtained as the same becomes better understood by reference to the following detailed description when considered in connection with the accompanying drawings. Furthermore, it should be noted that the same numbers are used throughout the drawings to reference like elements and features.

DETAILED DESCRIPTION

Figure 1:
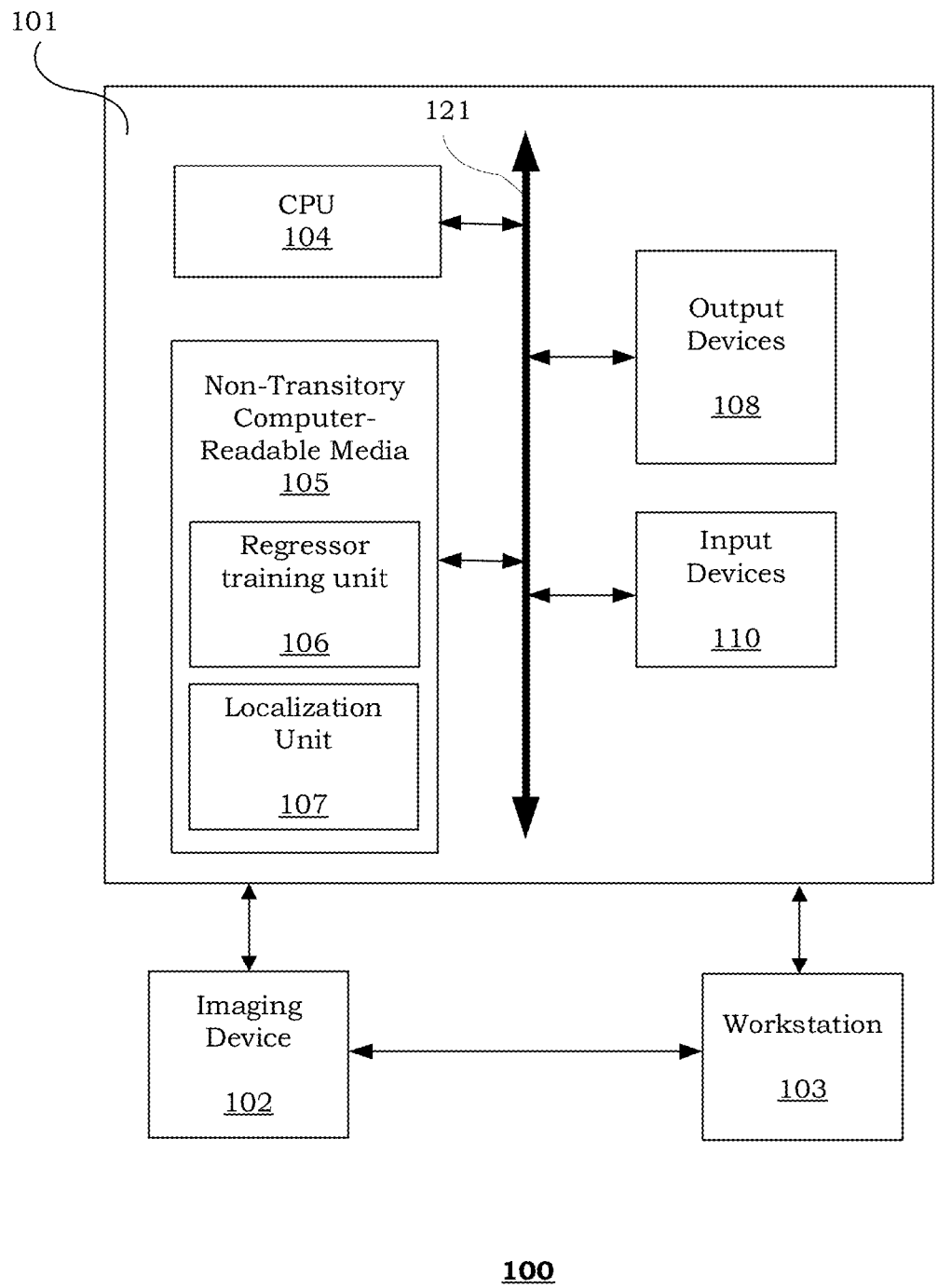
FIG. 1 is a block diagram illustrating an exemplary imaging system.

In the following description, numerous specific details are set forth such as examples of specific components, devices, methods, etc., in order to provide a thorough understanding of embodiments of the present invention. It will be apparent, however, to one skilled in the art that these specific details need not be employed to practice embodiments of the present invention. In other instances, well-known materials or methods have not been described in detail in order to avoid unnecessarily obscuring embodiments of the present invention.

While the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention.

The term "x-ray image" as used herein may mean a visible x-ray image (e.g., displayed on a video screen) or a digital representation of an x-ray image (e.g., a file corresponding to the pixel output of an x-ray detector). The term "in-treatment x-ray image" as used herein may refer to images captured at any point in time during a treatment delivery phase of a radiosurgery or radiotherapy procedure, which may include times when the radiation source is either on or off. From time to time, for convenience of description, CT imaging data may be used herein as an exemplary imaging modality. It will be appreciated, however, that data from any type of imaging modality including, but not limited to, X-Ray radiographs, MRI, CT, PET (positron emission tomography), PET-CT, SPECT, SPECT-CT, MR-PET, 3D ultrasound images or the like may also be used in various embodiments of the invention.

Unless stated otherwise as apparent from the following discussion, it will be appreciated that terms such as "segmenting," "generating," "registering," "determining," "aligning," "positioning," "processing," "computing," "selecting," "estimating," "detecting," "tracking" or the like may refer to the actions and processes of a computer system, or similar electronic computing device, that manipulates and transforms data represented as physical (e.g., electronic) quantities within the computer system's registers and memories into other data similarly represented as physical quantities within the computer system's memories or registers or other such information storage, transmission or display devices. Embodiments of the methods described herein may be implemented using computer software. If written in a programming language conforming to a recognized standard, sequences of instructions designed to implement the methods can be compiled for execution on a variety of hardware platforms and for interface to a variety of operating systems. In addition, embodiments of the present invention are not described with reference to any particular programming language. It will be appreciated that a variety of programming languages may be used to implement embodiments of the present invention.

As used herein, the term "image" refers to multi-dimensional data composed of discrete image elements (e.g., pixels for 2D images, voxels for 3D images, doxels for 4D images, etc.). The image may be, for example, a medical image of a subject collected by computed tomography, magnetic resonance imaging, ultrasound, or any other medical imaging system known to one of skill in the art. The image may also be provided from non-medical contexts, such as, for example, remote sensing systems, electron microscopy, etc. The methods of the inventions can be applied to images of any dimension, e.g., a 2D picture, 3D or 4D volume. For a 2- or 3-dimensional image, the domain of the image is typically a 2- or 3-dimensional rectangular array, wherein each pixel or voxel can be addressed with reference to a set of two or three mutually orthogonal axes. The terms "digital" and "digitized" as used herein will refer to images or volumes, as appropriate, in a digital or digitized format acquired via a digital acquisition system or via conversion from an analog image.

A framework for localizing anatomical structures in medical image data is described herein. Traditional learning-based methods have formulated anatomy detection or segmentation as a binary classification problem, i.e., each pixel/voxel is classified as "is the landmark versus is not the landmark" or "is in the organ versus is out of the organ" based on its appearance features. All pixels/voxels in the subject image need to be processed at run-time to make such binary classification decision. Since the total number of voxels/pixels in 3D whole body CT/MR scans is often beyond 100 million, even state-of-the-art methods may need approximately 0.8 seconds to detect a landmark in a whole body CT/MR scan and approximately 12 seconds to segment an organ in a typical CT scan.

In accordance with one aspect of the present framework, learning-based regression is combined with an efficient searching and/or deformation scheme for substantially real-time localization of anatomical structures in medical images. Unlike previous work, the present framework formulates anatomy detection or segmentation as a regression problem. In the training stage, regressors may be learned to predict spatial metrics (with respect to the anatomical structures) of a voxel based on its appearance features. At run-time, the responses of the regressors provide more information than those of classifiers in previous work. These responses may be leveraged to dramatically improve run-time efficiency. For example, with respect to the anatomical landmark detection problem, a regressor may be learned to predict the distance from a voxel to the target landmark under study. At run-time, assuming the response of the regressor at the currently visited voxel v is distance d, the next searching step may directly jump to those voxels with the distance d from voxel v. In this way, the run-time algorithm may quickly converge without exclusively having to visit all pixels/voxels in the image domain.

Previous regression-based anatomy detection algorithms visit each voxel in the image domain. As such, a significantly longer search time is required for landmark detection or segmentation even in small image volumes. For example, an organ box can only be detected in around 4 seconds. See, for example, Criminisi, A., et al. "Regression Forests for Efficient Anatomy Detection and Localization in Computed Tomography Scans," Medical Image Analysis, 2013, which is herein incorporated by reference.

Unlike previous work, the present framework does not aggregate regression responses at all voxels. Rather, an efficient searching or deformation strategy is employed to dramatically reduce the detection or segmentation time. The present framework only visits a very small proportion of the voxels in the image domain to localize anatomical structures in substantially real-time. For example, in a large whole-body scan image volume with 105 million voxels, only about 6000 voxels (0.005%) need to be visited for landmark detection. Successful landmark detection may be performed in less than 1 second. In addition, since the present framework is mainly data-driven, it can advantageously detect landmarks of any anatomical systems (e.g., neural, musculoskeletal, cardiovascular systems, etc.) given representative training cases. These exemplary advantages and features will be described in further detail in the following description.

For purposes of illustration, the following describes the framework as applied to localizing landmarks and boundary surfaces. However, the present framework can be applied to localizing any type of anatomical structures, including but not limited to, biologically meaningful points, lines, planes or surfaces in, for example, neural, musculoskeletal, cardiovascular, urological and other anatomical systems. The medical image data may also be acquired by any imaging modalities, such as CT, MR, PET, radiographs, and so forth.

FIG. 1 is a block diagram illustrating an exemplary imaging system 100. The imaging system 100 includes a computer system 101 for implementing the framework as described herein. The computer system 101 may further be connected to an imaging device 102 and a workstation 103, over a wired or wireless network. The imaging device 102 may be a radiology scanner such as a magnetic resonance (MR) scanner, PET/MR, X-ray or a CT scanner.

Computer system 101 may be a desktop personal computer, a portable laptop computer, another portable device, a mini-computer, a mainframe computer, a server, a storage system, a dedicated digital appliance, or another device having a storage sub-system configured to store a collection of digital data items. In one implementation, computer system 101 comprises a processor or central processing unit (CPU) 104 coupled to one or more non-transitory computer-readable media 105 (e.g., computer storage or memory), output devices 108 (e.g., monitor, display, printer, etc.) and various input devices 110 (e.g., mouse, keyboard, touch pad, voice recognition module, etc.) via an input-output interface 121. Computer system 101 may further include support circuits such as a cache, a power supply, clock circuits and a communications bus. Even further, computer system 101 may be provided with a graphics controller chip, such as a graphics processing unit (GPU) that supports high performance graphics functions.

It is to be understood that the present technology may be implemented in various forms of hardware, software, firmware, special purpose processors, or a combination thereof. In one implementation, the techniques described herein are implemented by regressor training unit 106 and localization unit 107. Regressor training unit 106 and localization unit 107 may include computer-readable program code tangibly embodied in non-transitory computer-readable media 105. Non-transitory computer-readable media 105 may include random access memory (RAM), read only memory (ROM), magnetic floppy disk, flash memory, and other types of memories, or a combination thereof. The computer-readable program code is executed by CPU 104 to control and/or process image data from imaging device 102.

As such, the computer system 101 becomes a specific-purpose computer system when executing the computer readable program code. The computer-readable program code is not intended to be limited to any particular programming language and implementation thereof. It will be appreciated that a variety of programming languages and coding thereof may be used to implement the teachings of the disclosure contained herein. Computer system 101 may also include an operating system and microinstruction code. The various techniques described herein may be implemented either as part of the microinstruction code or as part of an application program or software product, or a combination thereof, which is executed via the operating system. Various other peripheral devices, such as additional data storage devices and printing devices, may be connected to the computer system 101.

The workstation 103 may include a computer and appropriate peripherals, such as a keyboard and display, and can be operated in conjunction with the entire system 100. For example, the workstation 103 may communicate with the imaging device 102 so that the image data acquired by, for instance, imaging device 102 can be rendered at the workstation 103 and viewed on the display. The workstation 103 may include a user interface that allows a radiologist or any other skilled user (e.g., physician, technician, operator, scientist, etc.) to manipulate the image data. Further, the workstation 103 may communicate directly with computer system 101 to display acquired, reconstructed and/or processed image data.

For example, a radiologist can interactively manipulate the displayed representation of the processed image data and view it from various viewpoints and in various reading modes.

Figure 2:
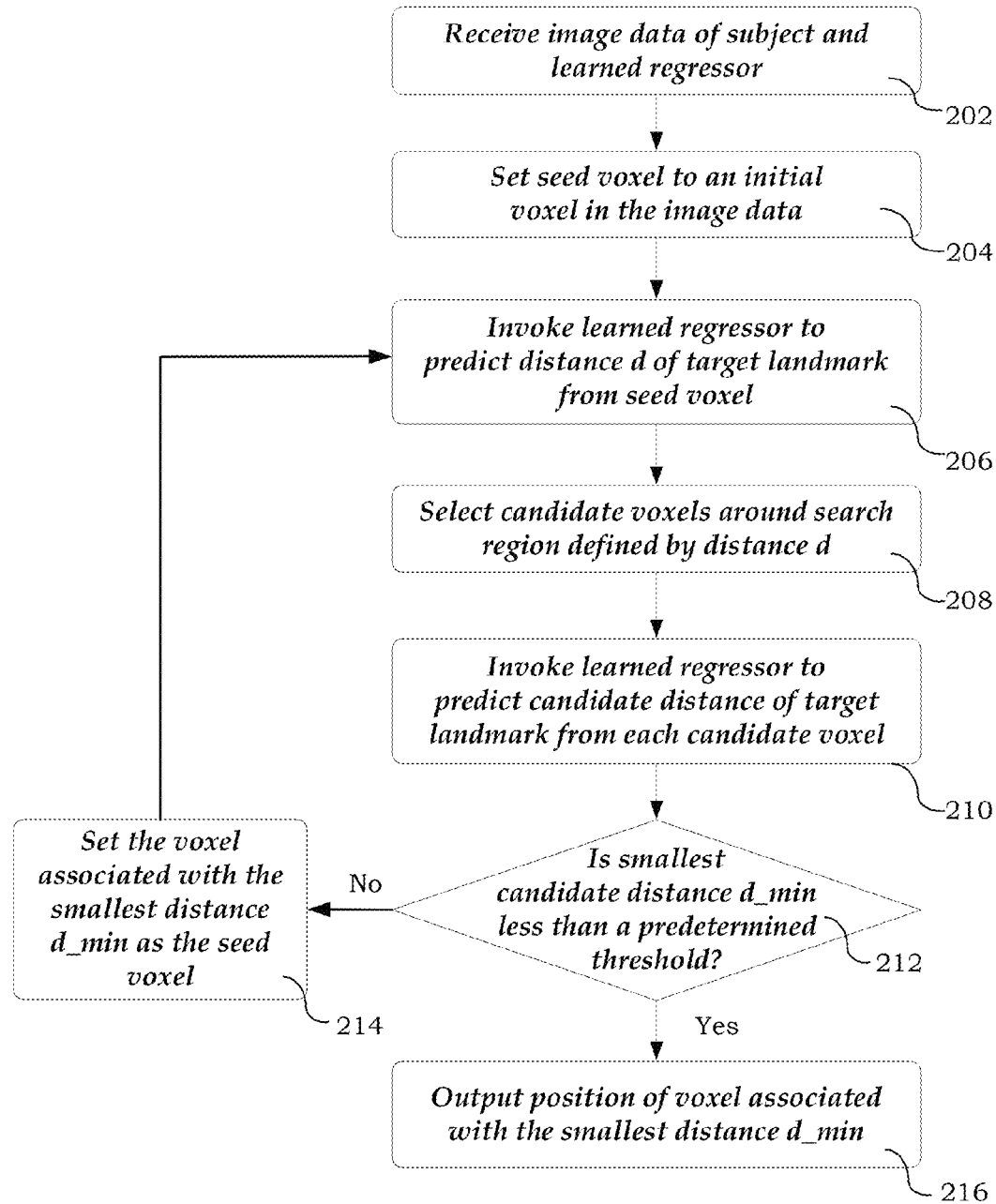
FIG. 2 shows an exemplary method of anatomical landmark detection.

FIG. 2 shows an exemplary method 200 of anatomical landmark detection. In some implementations, the method 200 is performed online (e.g., intra-operatively while a surgical intervention or procedure is performed on a subject or patient). It should be noted that the steps of the method 200 may be performed in the order shown or a different order. Furthermore, different, additional or fewer steps may be implemented. Even further, the method 200 may be implemented with the system 100 of FIG. 1, a different system, or a combination thereof.

At 202, localization unit 107 receives a learned regressor and image data of a subject (e.g., patient). The image data of the subject may be acquired by, for example, imaging device 102. The image data may be acquired by one or more different imaging modalities, including but not limited to, magnetic resonance (MR) imaging, computed tomography (CT), helical CT, x-ray, positron emission tomography (PET), PET-CT, fluoroscopy, ultrasound, single-photon emission computed tomography (SPECT), SPECT-CT, MR-PET, etc.

Regressor training unit 106 may train the regressor during an offline process (e.g., pre-operatively before a surgical intervention or procedure is performed on the subject). The regressor may be learned to predict a spatial metric of any voxel with respect to a specific anatomical structure (e.g., landmark) based on appearance features of the voxel. The spatial metric may include, but is not limited to, a scalar value (e.g., the Euclidean distance to one landmark), a vector (e.g., the directional displacement from a landmark) or a tensor (e.g., multiple displacement fields from multiple landmarks). The appearance features include, but are limited to, extended Haar wavelets, Gabor features, linear binary patterns or histogram of oriented gradients.

In some implementations, the regressor is learned to predict a scalar distance from any voxel v to the specific landmark L based on the appearance features of the voxel v. The regressor may be defined by Equation (1), which maps the appearance features of voxel v to a spatial metric d(v), i.e., the distance from v to the specific landmark L.

$$O: F(v) \to d(v) F(v) \in R^N, d(v) \in R \quad (1)$$

To achieve generality, data-driven approaches may be used to learn the regressor from a large number of training samples. Specifically, training samples may be denoted as voxels, $\{v_i | i=1, \ldots, N\}$, randomly selected from a set of training images, in which landmarks are manually labeled. For each training sample $v_i$, a large number of appearance features, e.g., extended Haar wavelets, Gabor features, linear binary patterns, etc., may be calculated to construct a feature vector $F(v_i)$. The training of a regressor may be formulated as $$O^* = \min \Sigma_i^N (O(F(v_i)) - d_i)^2 \quad (2)$$

wherein $d_i$ is the distance of training sample $v_i$, to the specific landmark L. The function O(.) may be optimized during the training stage using algorithms, such as random forest regression, Adaboost regression, and so forth. In $F(v_i)$, the most reliable appearance features to predict the distance from a specific landmark may be selected during the optimization procedure. During run-time, for any voxel v, the regression response value, i.e. Euclidean distance between v and L, may be calculated as $d = O^*(F(v))$.

At 204, localization unit 107 sets the seed voxel to an initial voxel in the image data. The initial voxel may be selected by, for example, uniformly sampling the image domain. At 206, localization unit 107 invokes the learned regressor to predict distance d of the target landmark from the seed voxel. At 208, localization unit 107 selects a set of candidate voxels located around a search region (or volume) that is defined based on the predicted distance d of the seed voxel. For example, the candidate voxels may be those voxels located at the boundary (or surface) of a sphere centered at the seed voxel with a radius d. At 210, localization unit 107 invokes the learned regressor to predict the candidate distance of the target landmark from each candidate voxel.

At 212, localization unit 107 determines if the smallest candidate distance d_min is less than a predetermined threshold (i.e., if convergence is achieved). If not, at 214, the localization unit 107 sets the voxel associated with the smallest distance d_min as the seed voxel. The method 200 then returns to 206. If the smallest candidate distance d_min is less than a predetermined threshold, at 216, localization unit 107 outputs the position of the voxel associated with the smallest distance d_min.

Accordingly, the seed voxel is used to define the search space for finding the target landmark. Unlike previous work, not all voxels of the original image data need to be searched. Rather, the search space may be defined by, for example, the boundary of a sphere centered at the seed voxel with a radius d (i.e., predicted distance). In such case, the specific landmark may only be located on the boundary surface of the sphere. The efficient searching framework may converge to the target landmark position in substantially real-time without exclusively searching all voxels (or pixels) in the image domain. In addition, confidences of the landmark detections may also be provided in substantially real-time.

Figure 3:
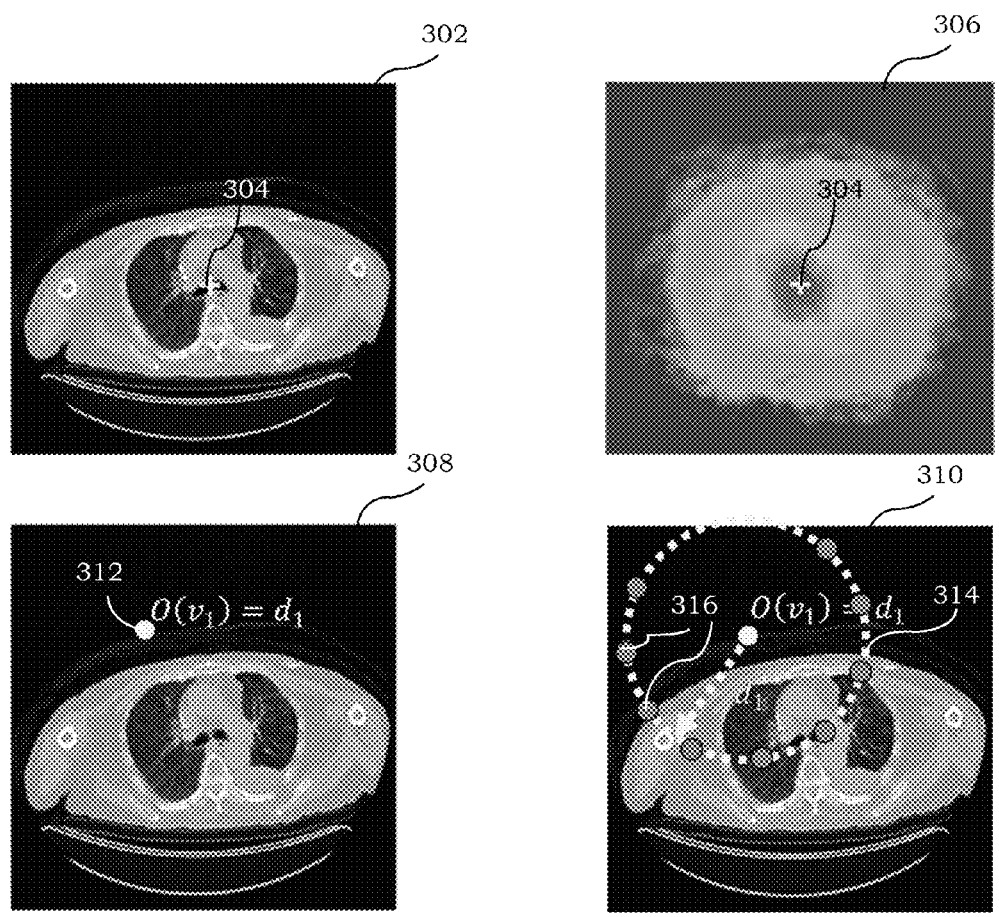
FIG. 3 illustrates exemplary results of the landmark detection method.

FIG. 3 illustrates exemplary results of the landmark detection method 200. Image 302 is the original CT image data of the patient. The goal is to localize the target landmark 304. Image 306 is a representative response map of a learned regressor that predicts the distance to the target landmark 304. The response map may be obtained by invoking the regressor at every voxel of the image 302. Each color or shading of the response map indicates the distance to the landmark 304. It can be observed that for most voxels, the predicted distance is close to the actual distance.

Instead of invoking the regressor at every voxel, the search space may be reduced based on the seed voxel to achieve substantially real-time detection. Image 308 shows that the predicted distance of the visited voxel $v_1$ (seed voxel) is $d_1$ 312. The seed voxel $v_1$ may be used to define the search space 314 for finding the target landmark, as shown in image 310. More particularly, the search space 314 may be defined by a boundary of a sphere centered at $v_1$ with radius $d_1$. The learned regressor may be invoked at candidate voxels located at the boundary or surface of the sphere (depicted as dots 316) to predict the candidate distances. In this way, the landmark localization can quickly converge.

Figure 4:
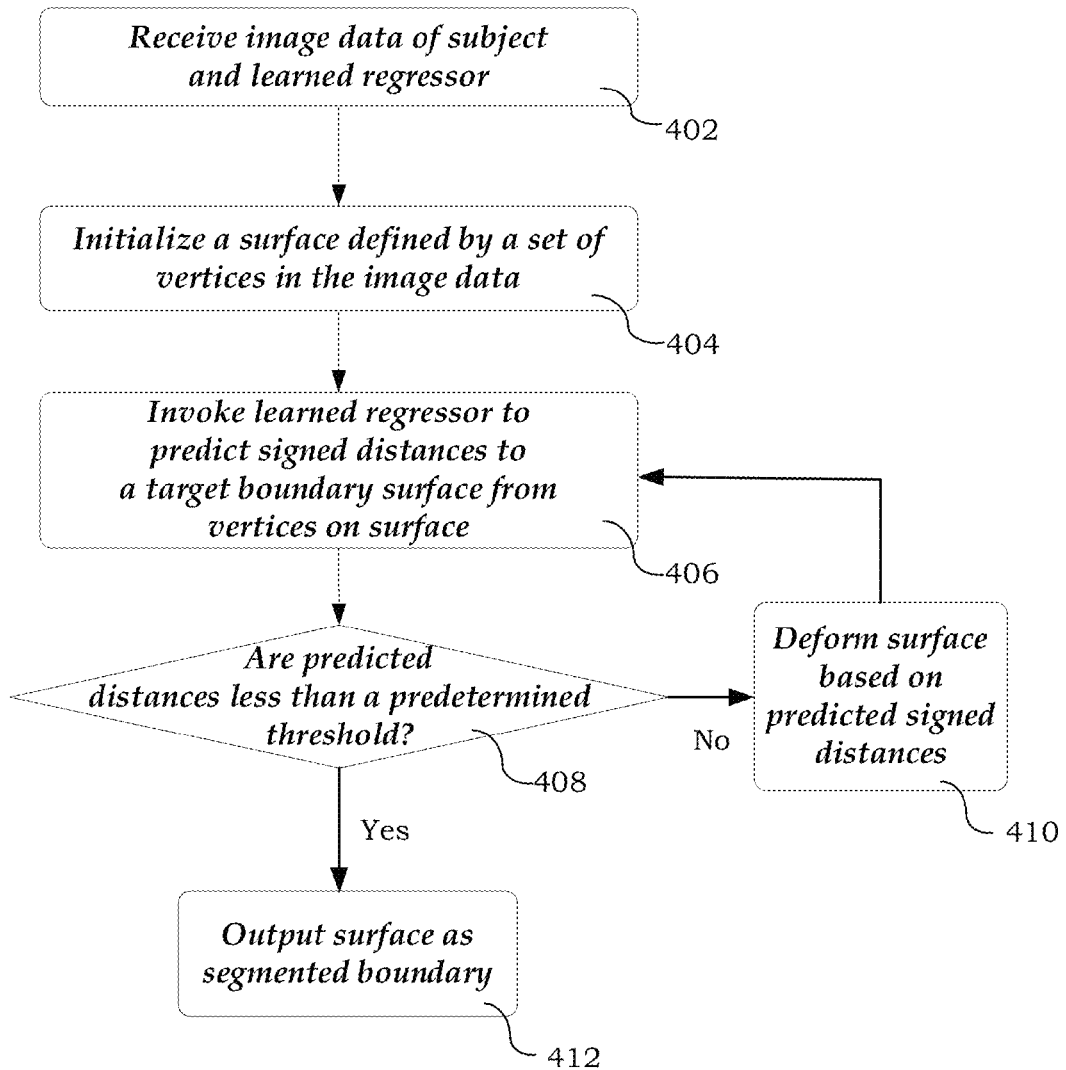
FIG. 4 shows an exemplary method of deformable segmentation.

FIG. 4 shows an exemplary method 400 of deformable segmentation. In some implementations, the method 400 is performed online (e.g., intra-operatively while a surgical intervention or procedure is performed on a subject or patient). It should be noted that the steps of the method 400 may be performed in the order shown or a different order. Furthermore, different, additional or fewer steps may be implemented. Even further, the method 400 may be implemented with the system 100 of FIG. 1, a different system, or a combination thereof.

At 402, localization unit 107 receives image data of a subject (e.g., patient) and a learned regressor. The image data of the subject may be acquired by, for example, imaging device 102. The image data may be acquired by one or more different imaging modalities, including but not limited to, magnetic resonance (MR) imaging, computed tomography (CT), helical CT, x-ray, positron emission tomography (PET), PET-CT, fluoroscopy, ultrasound, single-photon emission computed tomography (SPECT), SPECT-CT, MR-PET, etc.

The learned regressor may be trained by regressor training unit 106 during an offline process (e.g., pre-operatively before a surgical intervention or procedure is performed on the subject). In accordance with some implementations, the regressor is learned to predict the signed distance (or any other spatial metric) from any voxel to the boundary surface of a target structure (e.g., organ) based on the appearance features of the voxel. The regressor may be expressed in the same format as Equation (1), as previously discussed with reference to FIG. 2. However, d(v) may denote the signed distance from voxel v to the boundary surface of the target structure. The regressor may be learned using methods similar to those described with reference to FIG. 2. For example, the regressor may be optimized using random forest regression, Adaboost regression, and so forth.

At 404, localization unit 107 initializes a surface defined by a set of vertices in the image data. The surface may be initialized by, for example, using active shape models, sparse shape composition, or other techniques. See, for example, Cootes et. al, "Active Shape Models-Their Training and Application", Computer Vision and Image Understanding, Vol. 61, 1995, and Zhang et. al., "Towards robust and effective shape modeling: Sparse shape composition", Medical Image Analysis, Vol. 16, 2012, which are herein incorporated by reference.

At 406, localization unit 107 applies the learned regressor to predict a signed distance to a target boundary surface from each vertex on the surface. At 408, localization unit 107 determines if the predicted distances are less than a predetermined threshold. The smallest predicted distance, the average predicted distance or the median predicted distance may be used to compare the predicted distances with the threshold.

If the predicted distances are not less than a predetermined threshold (i.e., convergence is not achieved), at 410, localization unit 107 deforms the surface based on the predicted signed distances and repeats step 406. A hierarchical deformation strategy may be applied to deform the surface. See, for example, Zhan et. al. "Deformable segmentation of 3-D ultrasound prostate images using statistical texture matching method", IEEE Transactions on Medical Imaging, Vol. 25, 2006, which is herein incorporated by reference. If the predicted distances are less than a predetermined threshold (i.e., convergence is achieved), localization unit 107 outputs the surface as the segmented boundary at 412. Accordingly, the deformable surface is guided by the regressed spatial metric to the desired target boundary at substantially real-time. In addition, confidences of the segmentation may also be provided in substantially real-time.

Figure 5:
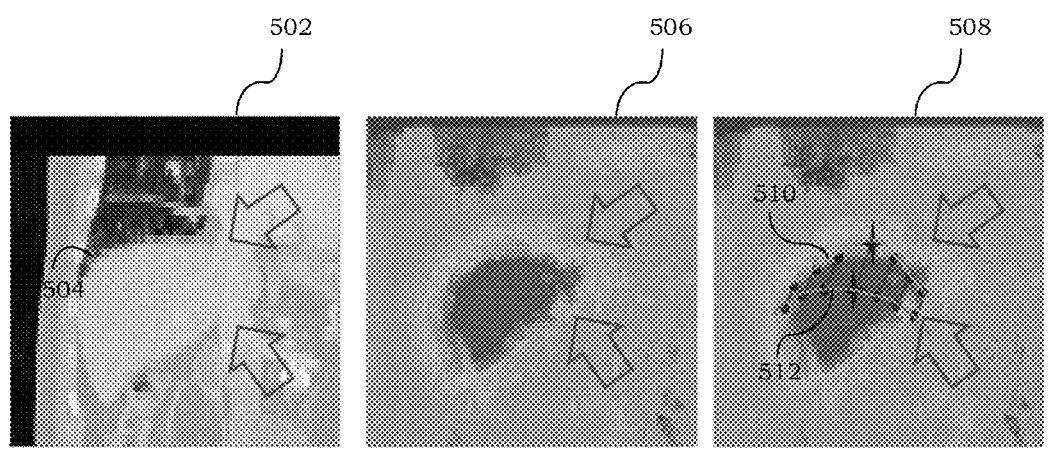
FIG. 5 illustrates exemplary results of the deformable segmentation method.

FIG. 5 illustrates exemplary results of the deformable segmentation method 400. Image 502 is the original CT image data of the patient. The goal is to localize the boundary surface 504 of the liver. Image 506 is a representative response map of a learned regressor that predicts the signed distance from a voxel to the target boundary 504. The response map may be obtained by invoking the regressor at every voxel of the image 502. Each color or shading of the response map indicates the predicted signed distance to the target surface 504. Negative distance (inside the liver) and positive distance (outside the liver) may be indicated by warm and cool colors respectively. Distance closest to zero (close to liver boundary) is indicated by yellow color. As can be observed from the response map, the regressed values can describe the liver boundary surface better than the original image 502, in which the vessel and the liver cannot be well-distinguished.

However, instead of invoking the regressor at every voxel, the search space may be reduced by deformable segmentation to achieve substantially real-time detection. Image 508 shows the results of employing a hierarchical deformable model to reduce the search space. With the regression responses, instead of searching all neighboring voxels to determine the next position of the deformable surface, the surface model 512 may quickly jump on to the boundary 510 based on the current regression values.

It should be appreciated that the present regressor-based framework may be applied to other medical imaging applications as well. For example, single landmark detection may be extended to multi-landmark detection. Instead of learning a regressor that predicts a distance scalar (to one landmark) by appearance features, the regressor training unit 106 may train a regressor that predicts a distance vector (to multiple landmarks) by appearance features. Each entry of the distance vector may represent the distance from the voxel to one of the landmarks.

While the present invention has been described in detail with reference to exemplary embodiments, those skilled in the art will appreciate that various modifications and substitutions can be made thereto without departing from the spirit and scope of the invention as set forth in the appended claims. For example, elements and/or features of different exemplary embodiments may be combined with each other and/or substituted for each other within the scope of this disclosure and appended claims.

The invention claimed is:

1. A non-transitory computer-readable medium embodying a program of instructions executable by machine to perform steps for localizing an anatomical structure, the steps comprising:
   (i) receiving a learned regressor and image data of a subject;
   (ii) invoking the learned regressor to predict a first distance from a seed voxel to a target anatomical structure in the image data based on appearance features of the seed voxel;
   (iii) selecting candidate voxels in the image data located at the first distance from the seed voxel;
   (iv) invoking the learned regressor to predict second distances from the candidate voxels to the target anatomical structure based on appearance features of the candidate voxels;
   (iv) in response to a smallest second distance being less than a predetermined threshold, outputting the candidate voxel associated with a smallest second distance as a localized voxel; and
   (v) in response to the smallest second distance being more than the predetermined threshold, setting the seed voxel to the candidate voxel associated with the smallest second distance and repeating at least steps (ii), (iii) and (iv).

2. The computer-readable medium of claim 1 embodying further instructions executable by the machine to train the regressor to predict the first and second distances.

3. The computer-readable medium of claim 2 embodying further instructions executable by the machine to train the regressor by using random forest regression.

4. The computer-readable medium of claim 2 embodying further instructions executable by the machine to train the regressor by using Adaboost regression.

5. A computer-implemented method of localizing an anatomical structure, comprising:
   (i) receiving a learned regressor and image data of a subject;
   (ii) invoking the learned regressor to predict a first spatial metric from a seed voxel to a target anatomical structure in the image data;
   (iii) selecting candidate voxels in the image data located around a search region defined by the first spatial metric;
   (iv) invoking the learned regressor to predict second spatial metrics from the candidate voxels to the target anatomical structure; and
   (v) in response to a smallest second spatial metric being less than a predetermined threshold, outputting the candidate voxel associated with the smallest second spatial metric as a localized voxel.

6. The method of claim 5 further comprising setting the seed voxel to the candidate voxel associated with the smallest second spatial metric and repeating at least steps (ii), (iii) and (iv) in response to the smallest second spatial metric being more than the predetermined threshold.

7. The method of claim 5 further comprising training the regressor to predict the spatial metric.

8. The method of claim 7 wherein the spatial metric comprises a scalar distance.

9. The method of claim 7 wherein the spatial metric comprises a vector displacement.

10. The method of claim 7 wherein the spatial metric comprises a tensor displacement.

11. The method of claim 7 wherein training the regressor to predict the spatial metric comprises performing random forest regression.

12. The method of claim 7 wherein training the regressor to predict the spatial metric comprises performing Adaboost regression.

13. The method of claim 7 further comprising selecting appearance features to predict the spatial matric.

14. The method of claim 13 wherein the appearance features comprise Haar wavelets, Gabor features, linear binary patterns, or a combination thereof.

15. The method of claim 5 wherein selecting the candidate voxels comprises selecting the candidate voxels at a boundary of a sphere centered at the seed voxel with a radius defined by the first spatial metric.

16. An anatomical structure localization system, comprising:
   a non-transitory memory device for storing computer-readable program code; and
   a processor in communication with the memory device, the processor being operative with the computer-readable program code to perform steps comprising
      (i) receiving a learned regressor and image data of a subject,
      (ii) invoking the learned regressor to predict signed distances from vertices on a surface to a target boundary surface in the image data,
      (iii) in response to the signed distances being less than a predetermined threshold, outputting the surface as a segmented boundary, and
      (iv) in response to the signed distances being more than the predetermined threshold, deforming the surface based the signed distances and repeating at least step (ii).

17. The system of claim 16 wherein the processor is further operative with the computer-readable program code to train the regressor to predict the signed distances.

18. The system of claim 17 wherein the processor is further operative with the computer-readable program code to train the regressor by using random forest regression.

19. The system of claim 17 wherein the processor is further operative with the computer-readable program code to train the regressor by using Adaboost regression.

20. The system of claim 16 wherein the image data comprises image data acquired by magnetic resonance (MR) imaging, computed tomography (CT), helical CT, x-ray, positron emission tomography (PET), PET-CT, fluoroscopy, ultrasound, single-photon emission computed tomography (SPECT), SPECT-CT, MR-PET, or a combination thereof.

* * * * *